(12) United States Patent
Christensen et al.

(10) Patent No.: US 12,407,897 B2
(45) Date of Patent: Sep. 2, 2025

(54) PEER-MANAGED CONTENT DISTRIBUTION NETWORK

(71) Applicant: Kollective Technology, Inc., Bend, OR (US)

(72) Inventors: Ragan W. Christensen, Rigby, ID (US); Mark A. Hinshaw, Bend, OR (US); Rhea Pokorny, Bend, OR (US); Matthew A. Townsend, Bend, OR (US); Garrett J. Gladden, Bend, OR (US); Ian K. Stewart, Bend, OR (US)

(73) Assignee: Kollective Technology, Inc., Bend, OR (US)

( * ) Notice: Subject to any disclaimer, the term of this patent is extended or adjusted under 35 U.S.C. 154(b) by 340 days.

(21) Appl. No.: 17/541,942

(22) Filed: Dec. 3, 2021

(65) Prior Publication Data

US 2022/0182444 A1 Jun. 9, 2022

Related U.S. Application Data

(60) Provisional application No. 63/121,387, filed on Dec. 4, 2020.

(51) Int. Cl.
*H04N 21/442* (2011.01)
*H04L 67/104* (2022.01)
*H04L 67/1061* (2022.01)
*H04L 67/1074* (2022.01)

(52) U.S. Cl.
CPC ... *H04N 21/44218* (2013.01); *H04L 67/1046* (2013.01); *H04L 67/1068* (2013.01); *H04L 67/1074* (2013.01); *H04N 21/44222* (2013.01)

(58) Field of Classification Search
CPC ........ H04N 21/44218; H04N 21/44222; H04L 67/1046; H04L 67/1068; H04L 67/1074; H04L 67/54; H04L 67/288; H04L 67/568
See application file for complete search history.

(56) References Cited

U.S. PATENT DOCUMENTS

| | | | | |
|---|---|---|---|---|
| 2009/0265473 | A1* | 10/2009 | Hydrie | H04L 67/101 709/204 |
| 2012/0317197 | A1* | 12/2012 | De Foy | H04L 67/1063 709/204 |

(Continued)

*Primary Examiner* — Philip J Chea
*Assistant Examiner* — James Ross Hollister
(74) *Attorney, Agent, or Firm* — Park, Vaughan, Fleming & Dowler LLP; Daniel Vaughan

(57) ABSTRACT

A synthetic peer-managed content delivery network self-organizes for the purpose of accessing one content item or a limited number of content items. A node joins the network at an identified attachment zone by requesting connections with existing nodes associated with the zone. Connected nodes become peers. The node may attempt to achieve a maximum number of peer connections, including upstream peers one hop closer to a root node, midstream peers the same distance from the root node, and downstream nodes one hop further from the root node. The content item is shared (in pieces or components if necessary) from a given peer to its midstream and downstream peers. Each node regularly informs its peers of its status regarding the content item and, to help organize the network, indicates whether its connected peers are able to accept a new peer connection.

33 Claims, 3 Drawing Sheets

(56) References Cited

U.S. PATENT DOCUMENTS

| | | | |
|---|---|---|---|
| 2013/0073727 A1* | 3/2013 | Souza | H04L 67/1059 709/224 |
| 2015/0234868 A1* | 8/2015 | Lavalaye | G06F 16/951 707/812 |
| 2018/0309636 A1* | 10/2018 | Strom | H04L 47/12 |

* cited by examiner

PEER-MANAGED CONTENT DISTRIBUTION NETWORK

RELATED APPLICATION(S)

This application claims the benefit of U.S. Provisional Application No. 63/121,387, which was filed Dec. 4, 2020 and is incorporated herein by reference. Also, this application is related to U.S. patent application Ser. No. 17/541,949, filed even date herewith, which is entitled "Measuring the Performance of a Peer-Managed Content Distribution Network".

BACKGROUND

This disclosure relates to the fields of computer systems and networking. More particularly, a system and methods are provided for organizing and operating a synthetic peer-managed network.

Existing content delivery networks (CDNs) are typically organized and operated in a static manner. That is, servers in a CDN are installed and configured for long-term usage and the configuration of the network does not vary except for the appearance and disappearance of content consumers.

When used to deliver live content (e.g., video and audio from a live presentation or event), there is an expectation that the quality of service (QoS) provided by the network will be such that the content can be enjoyed substantially as intended, with minimal latency or lag for example. However, a static CDN may be unable to meet the demand or provide the expected QoS if not preconfigured for a particular event.

For example, each user or consumer of the content typically requires a separate connection to an edge server at which the event is available. If a large number of users (e.g., hundreds or thousands) attempt to access the same event at the same time, the edge server may become stressed or overwhelmed. Similarly, if a large proportion of the users' client devices operate within a single local network (e.g., an organization's local intranet), or if most or all users are clustered into a limited number of geographically separated local networks, the network(s) may become saturated. As a result, users may experience buffering, lag, and/or other problems, and other traffic transiting the local network(s) may also suffer.

SUMMARY

In some embodiments, a synthetic peer-managed network is provided for distributing content to network nodes and/or aggregating and collecting data from the nodes. In these embodiments, a cluster of localized nodes is formed to distribute a one or more specific content items among the local nodes (e.g., a live multimedia presentation, a webinar). Clusters of nodes within the network are self-organizing beginning with one or more root nodes that can receive content from external entities, and extending to a predetermined depth. Each local node in the subnetwork or other logical address space that desires access to a content item seeks existing nodes to which it can connect.

Each node in the cluster maintains persistent connections with multiple peers from whom it seeks pieces of the content item and with whom it shares the pieces it has obtained. Each peer has a specified relationship (e.g., upstream, midstream, downstream) with its connected peers. Their relationships affect the directions in which content requests are sent and in which the content is distributed.

Nodes may be software-based and may be instantiated by agents that execute on users' electronic devices. An agent (e.g., a browser, a browser add-on or plug-in, a standalone program) may instantiate any number of nodes to obtain one or more content items simultaneously, and different nodes of one agent may participate in the same or different network clusters and connect with the same or different peer nodes.

Different nodes may perform differently, such as when they are instantiated with different resource allotments (e.g., storage (caching) capacity, host communication bandwidth, CPU capacity). Nodes' performances may affect how many other nodes connect with them as peers and/or how often they receive content requests from peers for an entire content item or one or more pieces of an item. To facilitate content sharing, nodes broadcast status messages to their peers indicating how much (if any) of a content item they have and can share. Pieces of a content item may be identified by byte (offset) ranges, time segments, or other units or components.

In some embodiments, operation of a peer-managed content distribution network involves configuring a new network node when a user of a device that hosts the node requests a content item. Potential attachment zones within the network are identified, with each zone comprising multiple nodes already connected to the network. The potential zones are sorted and the new node sends attachment requests to nodes in one or more zones until one or more requests are accepted, at which point the new node establishes persistent peer connections with other nodes in the selected zone.

An illustrative peer-managed content distribution network includes a hierarchy of nodes descending from one or more root nodes. Each node in the hierarchy establishes connections, or at least attempts to establish connections, with at least one upstream node, one midstream node, and one downstream node. When a given node obtains all or a portion of a content item, it shares the content with midstream and/or downstream nodes.

DETAILED DESCRIPTION

The following description is presented to enable any person skilled in the art to make and use the disclosed embodiments, and is provided in the context of one or more particular applications and their requirements. Various modifications to the disclosed embodiments will be readily apparent to those skilled in the art, and the general principles defined herein may be applied to other embodiments and applications without departing from the scope of those that are disclosed. Thus, the present invention or inventions are not intended to be limited to the embodiments shown, but rather are to be accorded the widest scope consistent with the disclosure.

Introduction

In some embodiments, a synthetic peer-managed network or cluster of nodes for distributing content among member nodes and/or aggregating data from the nodes is self-organized and managed by the nodes. In these embodiments, a cluster of nodes represents consumers of the data that are logically and/or geographically localized, such as within a single local area network or intranet, a subnetwork, or other collection of computing devices. For example, a cluster of nodes may be defined to include nodes having a range of network addresses (e.g., IP or Internet Protocol addresses) within an organization, such as a /24 CIDR block comprising 256 nodes of a subnetwork.

Nodes that belong to a local cluster within a peer-managed content delivery network self-organize according to predetermined criteria that define how the cluster forms and evolves. Nodes can join and depart the cluster at will, with the cluster self-healing as necessary when a node joins or departs. Generally, nodes within a given cluster of nodes exchange content only with other nodes in the same cluster, except for the root nodes (the most upstream nodes in the cluster).

Nodes may be software entities hosted by various types of computing and communication devices. Each device executes an agent that is responsible for instantiating a node for each content item to be consumed and for managing the nodes. Some implementations of an agent may be browser-based (e.g., a plug-in or add-on to a user's browser); other implementations may be stand-alone programs that execute independently of browser software. For example, when a user expresses an interest in a particular content item, the agent instantiates one or more nodes to join one or more network clusters and obtain the item.

Figure 1:
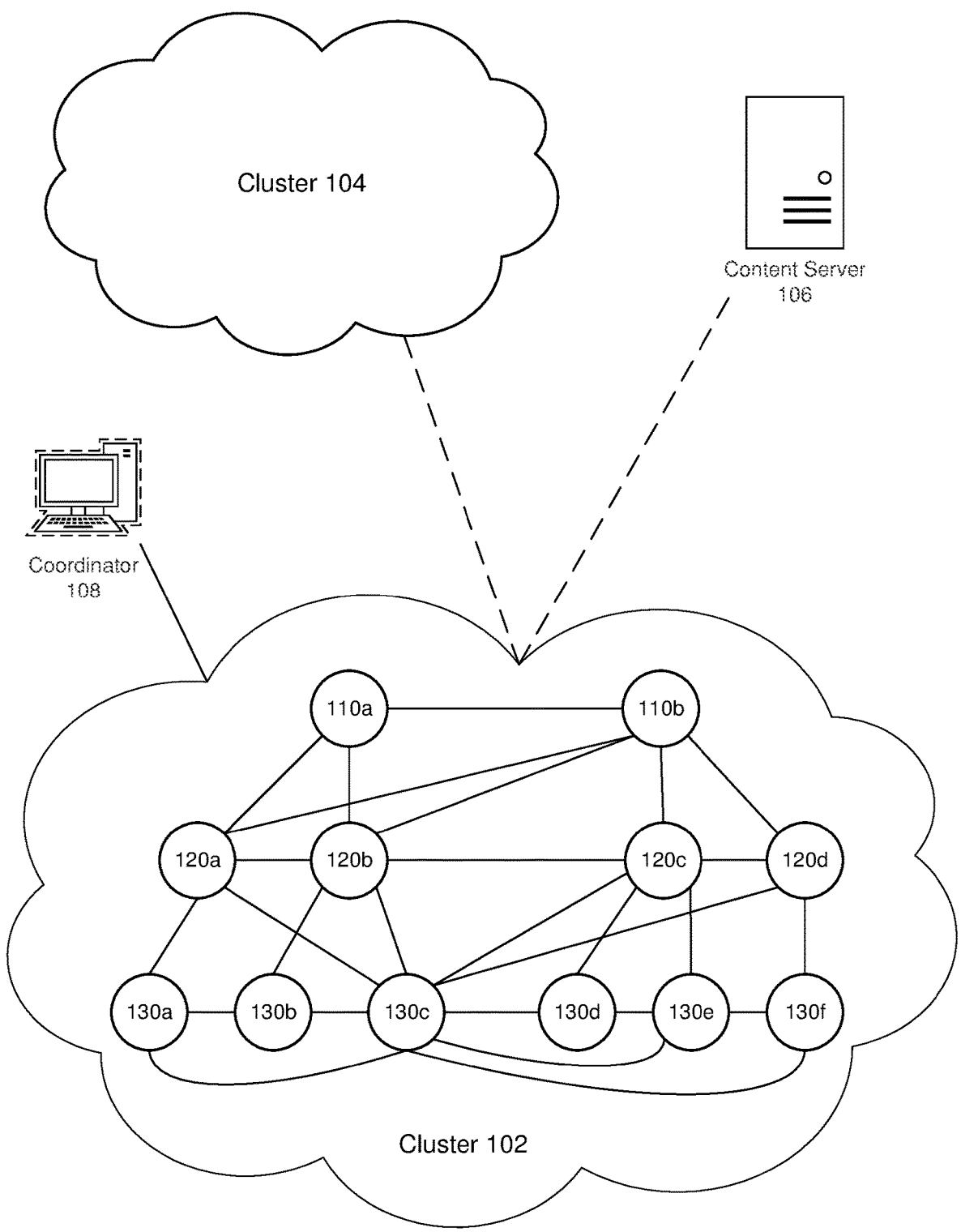
FIG. 1 is a block diagram depicting an environment in which a peer-managed content delivery network may operate, in accordance with some embodiments.

FIG. 1 is a block diagram depicting a computing environment in which a synthetic peer-managed content delivery network may operate, according to some embodiments. In different implementations, the network may be used to distribute a content item to network nodes, collect data from network nodes, or both distribute content and collect data. A network or cluster may alternatively be termed a 'graph.'

In these embodiments, cluster 102 is a collection of software nodes created and managed by agents executing on physical and/or virtual devices operated by users that wish to access content, especially passive content (i.e., content that is not interactive). The network may be envisioned as comprising just cluster 102 in some implementations, such as when the content that is distributed through the network is distributed only to members of cluster 102. For example, a single webinar, demonstration, software program or update, live media presentation or other event may reside on or originate from content server 106 or some other source (e.g., a content delivery network) for consumption by users associated with the nodes of cluster 102.

In other implementations, cluster 102 is just part of a larger peer-managed content delivery network. For example, members of cluster 102, cluster 104, and/or other clusters may consume the same content item from content server 106 or elsewhere, in which case clusters 102, 104 may be considered parts of one network. In these implementations, however, each cluster evolves and operates independently of the other(s).

Communication links illustrated in the environment of FIG. 1 may include point-to-point and/or network connections. Networks over which a peer may communicate with another entry may include wide-area networks, public networks (e.g., the Internet), local-area networks, private networks (e.g., private intranets), virtual private networks (VPNs), etc., and may include wired and/or wireless links.

Cluster 102 includes multiple layers of nodes, with the maximum depth of the cluster being one of multiple variables or parameters enforced by members as the cluster evolves. In the illustrated environment, the maximum depth of cluster 102 is three. Nodes of cluster 102 communicate with other nodes of the same cluster according to three types of directional relationships that reflect their relative positions in the cluster: upstream, downstream, and midstream.

As used herein, a 'node' is a member of a peer-managed cluster or network. A 'peer' of a given node is another node in the same cluster with which the given node has established a persistent connection in order to share content. As discussed below, a node may be limited in the number of peers it may have (e.g., because of resource constraints).

Nodes 110a, 110b are root nodes (or first-level nodes) of the cluster. They engage in midstream communications with each other (assuming they have a peer connection) and engage in downstream communications with any of nodes 120a, 120b, 120c, 120d (second-level nodes) with which they establish peer connections. Second-level nodes engage in midstream communications with other second-level nodes with which they peer, upstream communications with any root node(s) with which they peer, and downstream communications with any of nodes 130a-130f (third-level nodes) with which they establish peer connections. Third-level nodes engage in midstream communications with other third-level nodes with which they establish peer connections, and upstream communications with any second-level nodes with which they peer.

Thus, relative to a given node, an upstream peer is one hop closer to the top or root of the network, a midstream peer is at the same depth, and a downstream peer is one hop lower in the network or graph. When a node shares content with a midstream or downstream peer it may transmit the entire item or may share it in pieces, which may be measured in byte ranges, time-based segments (e.g., a content item may be logically divided into segments that correspond to one second or multiple seconds of playtime), tracks, blocks, and/or other components.

Coordinator 108 of FIG. 1 is a central entity (or one of multiple central entities) responsible for maintaining information about cluster 102 and/or other clusters of a peer-managed content delivery network. For example, it may store the current structure and constitution of all operating clusters (e.g., the number of nodes in each cluster, the root nodes of each cluster, the number and/or identities of nodes' peers). Although shown as a physical (or virtual) computer system and separate from any cluster in the environment of FIG. 1, in other embodiments it may comprise one or more files in one or more local file systems (e.g., for use by cluster nodes in corresponding localities), a dedicated physical device on the same physical network as the devices that host a cluster of nodes, a node within a cluster, a service residing in the cloud, or may take some other form. Each node's agent acts as the interface between the node and the coordinator.

Note that, in FIG. 1, not all communication links are illustrated. For example, within cluster 102, all possible content-sharing communication links within the cluster are shown only for nodes 110b and 130c (assuming that they are able to make the necessary number of peer connections). Specifically, node 130c has no downstream peers, but engages in midstream communications via peer connections with all other level-three nodes, and engages in upstream communications via peer connections with all nodes at level two. Node 110 engages in downstream communications via peer connections with all level two nodes, and midstream communications via a peer connection with node 110a.

Also note that, in the illustrated environment, nodes in cluster 102 are limited to establishing peer connections (and sharing content) with nodes at the same level and nodes one level above or below them. In other embodiments, a node may be able to make connections deeper or higher in a cluster. In yet other embodiments, selected peers may be prevented from establishing any peer connections. For example, a node that joins cluster 102 via a virtual private network (VPN) may be prevented from establishing peer connections in order to avoid transferring large amounts of content or data via the VPN connection.

In addition to a maximum depth, nodes may be assigned capacities regarding the number of peers or peer connections it may maintain. In some embodiments, a node maintains persistent communication channels with as many peer nodes as it can connect to, up to its capacity. However, because each channel it maintains consumes resources, limiting the nodes maximum number of connections prevents it from becoming overloaded.

In particular, a node may be instantiated with fixed or limited resources (e.g., storage capacity, local bandwidth, CPU capacity) and/or performance that is artificially limited in order to limit resource consumption. This information will be provided to other nodes when the node is available for connecting with as a peer, and those other nodes may opt for connections with higher-performing nodes over lower-performing nodes. In addition, because a node with performance constraints may impede efficient content sharing, lower-performing nodes may seek to connect to a network or cluster at a relatively deep level. In contrast, robust nodes may seek to connect at higher levels. Root node positions may be limited to nodes with relatively good resources.

In some implementations, a node's specified capacity encompasses all types of peer relationships (i.e., upstream, midstream, and downstream). In these implementations, it may open communication connections with the first n peers it encounters (where n=the node's assigned capacity) and then cannot open any more unless and until it disconnects from an existing peer. In an illustrative implementation, a typical node's capacity may be approximately 15. In other embodiments, a node's capacity may specify a maximum (or minimum) number of peers of different types. Nodes that execute on more robust host devices (e.g., server computers, workstations) may have higher capacities, while nodes hosted by less robust devices (e.g., smart phones, tablets) may have lower capacities.

In general, when a node joins or attaches to a cluster, it will try to connect to as many peer nodes as possible as quickly as possible. It may seek to maximize one or more types of connections (e.g., upstream), possibly while attempting to position itself as high as possible in the hierarchical cluster.

Cluster Formation and Development

By modifying parameters associated with a cluster (e.g., maximum depth, maximum number of nodes, node capacities), the shape of the cluster can be customized to a particular operating environment (e.g., the types of devices that host the nodes, the type of content being distributed). For example, a cluster with relatively low depth will generally develop greater breadth when populated with a given number of nodes, which means that most nodes will be relatively close to root nodes and the content source and therefore experience lower latency because content can be immediately retrieved from the source, by a root node, instead of requesting it from peers. On the other hand, a cluster with relatively deep depth will generally develop less breadth but provide greater peering efficiency, possibly at the risk of increased latency. In other words, a deeper cluster causes a content item to be shared more among nodes while relying less upon an external content source.

In some embodiments, an administrator can adjust a setting for obtaining greater peering efficiency or providing rapid receipt of the first frame, segment, or piece of a content item when a cluster is being formed. More particularly, when one or more nodes begin to form a new cluster associated with a particular content item, this preference will determine whether acquisition and distribution of the item may pause (e.g., for several seconds) to allow more nodes to join the cluster and connect with peers—and therefore promote better peering efficiency—or whether each initial node may immediately resort to an external source to obtain the item (and consequently reduce peering efficiency). The administrator may instead select a compromise setting that reduces the amount of maximum amount of time that the cluster will wait for additional nodes to form peer connections before retrieving the item from outside the cluster. After the specified period of time, operation of the cluster proceeds normally, as discussed further below.

Further, this setting regarding the early stage of formation of a cluster may be tailored to different environments or use cases. For example, if the content item is a live event occurring during business hours, which means many users are likely to connect during a very short time period, the peering efficiency setting may be configured to wait only a few (e.g., five) seconds when one or more initial nodes form the cluster to allow more peering connections to be established. In a different environment or situation, such as when a first node is instantiated during non-working hours for the purpose of accessing video on-demand, the peering efficiency setting may be configured to favor rapid access to the first frame (by retrieving the item from an external source) instead of waiting for more peers to join the cluster.

The maximum population of a network cluster is related to a physical or logical boundary of the cluster, which may correspond to a defined locality or a specific portion (or portions) of an organization's network. Every node that spawns within the specified boundary will join the same cluster and will normally engage in peer-to-peer communications (to distribute content and/or aggregate data) only with other peers in the same cluster.

However, root nodes of a cluster (such as nodes 110*a*, 110*b* of cluster 102) are responsible for communicating with external entities (e.g., another cluster, a content server, a central coordinator, another content network) to obtain content to share within cluster 102 and/or to report data gathered or aggregated within the cluster. In different embodiments, interaction with external content sources (and/or other entities) may be restricted to root nodes only or may be permitted by lower-level nodes as a last resort (e.g., if the node cannot obtain desired content from any peer).

An administrator or operator of a peer-managed content distribution network may set rules, parameters, or preferences to identify the logical boundary that defines a cluster within which a new node may attempt to make peer connections. For example, as mentioned above a 'locality' for establishing a network cluster may be defined to include a physical site of an organization. Alternatively, a cluster boundary may be defined as one or more specified subnetworks of an organization's network (e.g., 10.1.1.0/24, 192.168.1.0/22), or within a range of specified network addresses or a set of CIDR (Classless Inter-Domain Routing) blocks. A relatively large locality (e.g., a large site or campus of an organization) that spans multiple CIDR blocks or address ranges may include sub-localities. For example, a separate sub-locality may be specified for each of multiple CIDR blocks. In other words, within a relatively large locality, two new nodes may join two different clusters based on their network addresses.

In some other embodiments, such as when a node is created outside of all predefined localities or when localities are not predefined within a network, a default subnet mask or CIDR block (e.g., /24, /23) may be specified to limit the node to peering only with other nodes in the same address range or block.

As another option, a peering boundary may be established to match a public IP (Internet Protocol) address. For example, an organization may specify that all nodes that are created with the same public IP address are only able to peer with other nodes that have the same public IP address.

However, tools exist that may artificially change a node's public IP address from time to time. For example, an organization may use a Zscaler™ service (described at www.zscaler.com), in which case a node may hop between multiple different public IP addresses that depend on the geographical location of the node's host. This could complicate the node's operation if its peering boundary is partly or fully dependent on its public IP address. Therefore, in some implementations, an administrator who uses such a tool may activate a network setting that essentially expands the definition of a node's public IP address to include all of the multiple addresses among which the node may hop.

As a guiding principle, settings related to formation of a cluster may be configured so as to prevent or at least restrict a given node from peering with another node that is not physically or geographically proximate to the node unless, perhaps, the nodes are coupled by a relatively inexpensive communication link and their sharing of content via the link will not disrupt other entities within the organization.

For example, one or more special localities may be defined for nodes that join a peer-managed content distribution network via VPNs. These localities may be identified in the same manner as any other locality, with one or more address ranges or CIDR blocks (e.g., 132.152.0.0), and prevent their members from peering with any other nodes. Instead, they will receive the content item associated with the cluster via connections with one or more external sources.

A given node belongs to only one cluster or graph. Typically, for each content item a given user desires to simultaneously consume, he or she operates a browser or application to select the item. For each item, the agent causes a separate node to be spawned as part of a cluster associated with that content item. All nodes spawned by one agent may exchange information regarding themselves, their peers, their clusters, etc.

Because the content being distributed within cluster 102 is of a broadcast (or one-to-many) type, a primary function of the content distribution scheme is to deliver the content quickly and reliably downward and outward through a cluster, so as to provide a quality experience for consumers without excessive buffering (e.g., with no more than seconds of latency, for example). However, a channel from consumers toward upstream peers and/or a content source may be supported for textual chat or recorded (i.e., non-real-time) audio comments, as well as the aggregation and reporting of environmental and/or operational data from network nodes.

Figure 2:
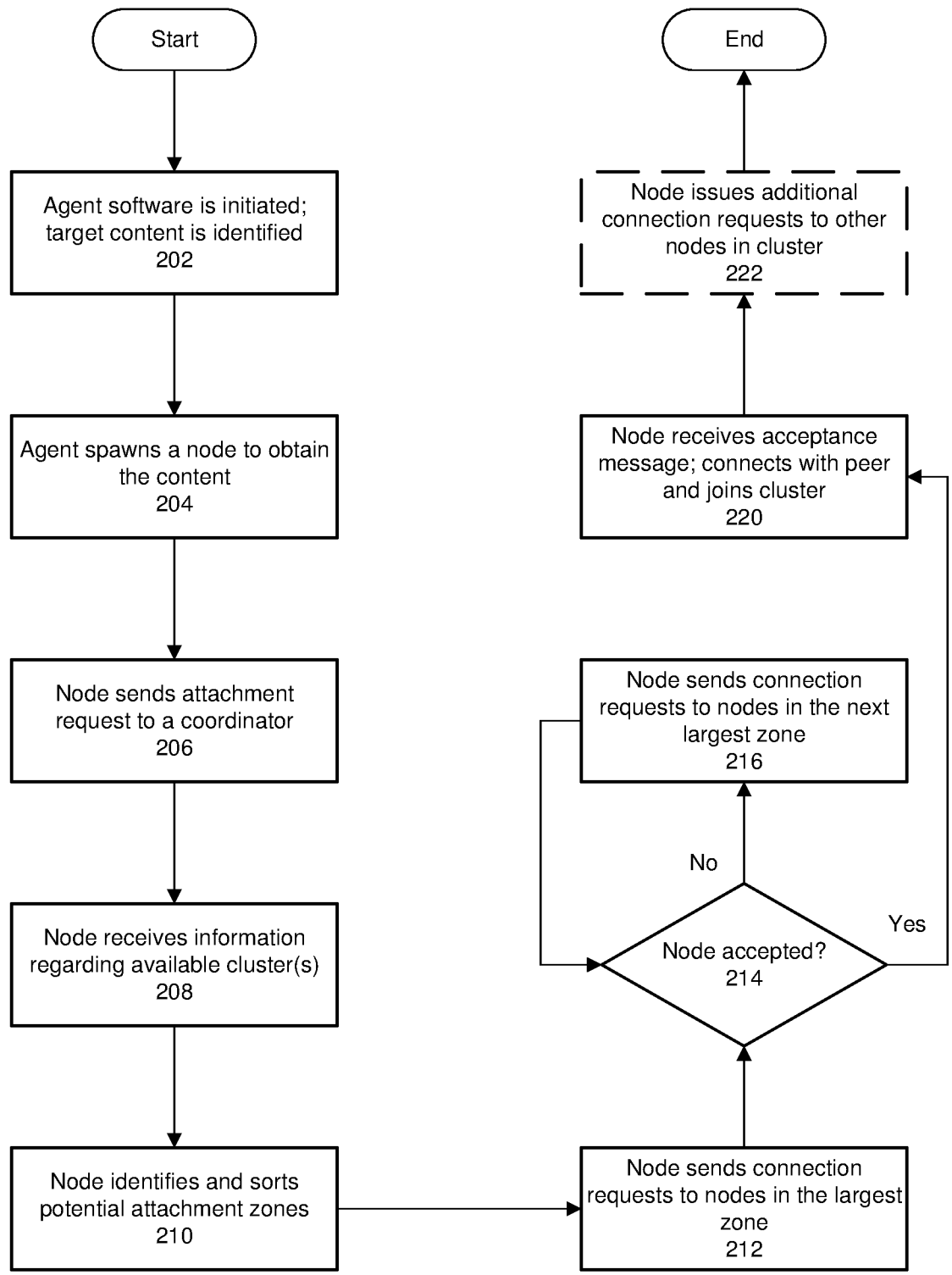
FIG. 2 is a flow chart demonstrating a method of developing a peer-managed content delivery network, in accordance with some embodiments.

FIG. 2 is a flow chart demonstrating a method of developing a synthetic peer-managed content delivery network, according to some embodiments. In one or more embodiments, one or more of the operations may be omitted, repeated, and/or performed in a different order. Accordingly, the specific arrangement of steps shown in FIG. 2 should not be construed in a manner that limits the scope of the embodiments.

In operation 202, a user of a compatible device (e.g., a stationary or mobile computer, a smartphone, a tablet) opens or activates software associated with accessing content and/or other information (e.g., software updates) via a peer-managed content delivery network. The agent software may comprise (or be part of) a browser navigated to a particular site or page, an add-on or plug-in to a browser, a media player, or some other standalone software package. Once initiated, the agent may continue executing as long as some content is being accessed, as long as the software continues executing, or as long as the device is operating. Depending on the type of agent (e.g., browser-based, standalone), different nodes created by different agents may have different resources (e.g., non-persistent vs. persistent storage) or levels of access to particular resources (e.g., CPU cycles, network bandwidth).

While the agent is executing, the user expresses a desire to access a particular content item or set of content. He or she may identify it with a hyperlink, a name, by selecting it from a menu, or may choose it in some other manner.

In operation 204, the agent spawns a node dedicated to accessing the specified content. The node may exist as long as the item is desired (e.g., as long as a media player or browser has the item open), after which it may terminate automatically. In some implementations, the agent may spawn multiple nodes to access the content item via different clusters (or the same cluster). This may be done to ensure access to the item, to compare performances of different clusters, or the nodes may be spawned with different resource allotments and the nodes' relative performances may be compared.

In operation 206, the node sends an attachment request to a coordinator (such as coordinator 108 of FIG. 1). The node may be informed of a responsible coordinator (e.g., identity, address, URL) when spawned by the agent. With the attachment request, the node identifies itself, its location (e.g., network address), its capacity (number of peer connections it can maintain), the target content item, etc.

The attachment request is intended to discover an existing cluster that the node can join to access the content item; in other words, a cluster in which at least one node (but preferably many more nodes) have excess capacity to accommodate the node and that serves the locality or subnetwork in which the node resides. More specifically, even if a given cluster that is associated with the content item has not reached its maximum population, if no nodes of the cluster have any remaining node capacity, the node will not be able to join the cluster. Similarly, a cluster may be available with one or more member nodes that have low amounts of excess capacity, such that the node could only establish peer connections with a limited number of them (e.g., much fewer than its node capacity); by joining such a cluster the node risks not being able to obtain the content expeditiously.

In operation 208, the coordinator responds by identifying clusters that are associated with the target content item and that have room for a new node, as well as identities (e.g., addresses) of nodes within those clusters that can accept a new peer (e.g., nodes that have not yet reached their peer capacities)—these may be termed 'candidate peers'. In some embodiments, a candidate peer may be identified by the cluster or locality in which it resides, its depth in the cluster (or number of hops from a root node of the cluster), its remaining node capacity, how long it has been a member of the cluster, the type of device that hosts the candidate peer, and/or any other pertinent information.

It should be noted that the coordinator may indicate that there is no available cluster corresponding to the target content item and that serves the node's locality or network address. In this case the node may become the root node of a new cluster. The coordinator may specifically direct the node to take on this role by creating a new logical cluster and assigning the node to it.

In operation 210, the node analyzes the coordinator's response to the attachment request, and filters or prioritizes the clusters and candidate peers that it may attempt to join. For example, in some embodiments, the node examines the response and identifies one or more potential attachment zones for joining each identified cluster. Each attachment zone corresponds to a specific level (i.e., a specific number of hops from a root node) of a specific cluster, around which one or more existing nodes have excess capacity—including potential upstream nodes that have capacity for at least one more downstream connection, potential midstream nodes with capacity for at least one more midstream connection, and/or potential downstream nodes that have capacity for at least one more upstream connection.

Having identified potential attachment zones, the node sorts them according to the number of peers in each zone, from greatest number of possible peers (the largest attachment zone) to least number of possible peers (the smallest attachment zone). During the sorting process, however, the node disregards attachment zones where no upstream connection could be established (i.e., zones where no nodes that are one hop closer to the root have capacity for a downstream connection). Note that, in alternative embodiments, potential attachment zones may be sorted and attachments attempted based on some other criterion or criteria, such as numbers of existing or available connections among candidate peers in the zones, levels of performance of candidate peers, locations of candidate peers in the cluster hierarchy, etc.

In operation 212, the node sends connection requests to every candidate peer in the largest attachment zone. Each recipient will determine if it can accept a new peer; in some cases, a candidate peer node's capacity may be filled before it receives the connection request, in which case it may ignore the request or respond negatively. Some candidate peers may not receive the request (or their response to the request may not reach the node) if, for example, a firewall or other network entity blocks communication between the two nodes.

In operation 214, the node considers the results of the transmitted requests. If no acceptance messages are received to the requests in a predetermined period of time, the method continues at operation 216; otherwise, the method advances to operation 220.

In operation 216, the node turns to the next largest attachment zone and sends connection requests to all candidate peers in the zone. The method then returns to operation 214. In some embodiments, if no connection can be made despite polling all attachment zones, the node may send a new attachment request to the coordinator. Alternatively, the coordinator may instruct the node to start a new cluster.

In operation 220, one or more candidate peers return acceptance messages in response to connection requests from the node. An acceptance message may provide metadata such as identities of existing peers with which the accepting peer has connections, information identifying how much of the content item the accepting peer has in its local storage (e.g., in cache), etc.

At this point, the new node is part of the accepting nodes' cluster and can begin accessing the content item via the accepting nodes. The coordinator is advised of the modification to the cluster, possibly through a process of data aggregation wherein information from peer nodes flows upstream from leaf nodes of all clusters, through the clusters' roots, and to the coordinator or coordinators.

In some embodiments, each network cluster comprises one or more peering groups (or peer groups) comprising nodes that have peered with each other and no other nodes. In particular, in these embodiments a new node joins a peering group and peers only with members of that group. Depending on the node capacities of the members of the group, however, not all of them may be able to establish peer connections with all other group members. Peer groups may have maximum sizes and/or preferred sizes that support efficient content sharing. In some implementations a network administrator or operator may seek to promote the establishment of peering groups with approximately 15-20 members.

In optional operation 222, the node may issue additional connection requests to midstream and/or upstream nodes in the cluster it just joined, particularly one or more upstream nodes. It may attempt to establish a default connection pattern, with or without filling its node capacity, which may place different limits on the different types of peer connections. In an illustrative implementation, a given node's capacity for midstream connections may be approximately twice its capacity for upstream and/or downstream connections.

After operation 222, the illustrated method of modifying a cluster ends. Details regarding distribution of content to nodes of a cluster are provided below.

In some embodiments, to promote development of a robust set of connected peers by some or all nodes, members of a peering group may exchange lists of their peers to allow those nodes with unused capacity to connect to one or more of the listed peers. For example, a node with excess capacity may issue a request for peer candidates and, in response (and assuming other nodes in the cluster or its peering group have excess capacity), may receive one or more lists of peer candidates in response. The list will identify peers (of the node that sent the list) that have excess capacity and can therefore add one or more peers. From the list, the requesting node may send attachment requests to any or all identified upstream, midstream, and/or downstream nodes until it has no excess capacity. Peer candidates in a list may be sorted by depth in the cluster, so that the requesting node can target a particular type of node (e.g., upstream, midstream).

In these embodiments, a peer candidate provider is a node that sends a list of peer candidates to a midstream or downstream peer. A peer candidate consumer is a node that receives a list of peer candidates from a midstream or upstream peer. A cluster peer candidate provider is a node that receives a request for peer candidates from a downstream node and forwards the request upward through the cluster; it also provides its own list in response to the request.

A node that has excess capacity sends a peer candidate request to its midstream and upstream peers, and may also send a request to a cluster peer candidate provider (which may be more than one hop away) if its peer candidate providers cannot or do not suggest any candidates. To allow nodes to keep track of their peers' capacities, each time a node adds or loses a connected peer it broadcasts that fact to its connected peers and provides information regarding an added peer. The message may indicate whether the sending node does or does not have any capacity to connect to additional peers (and may identify particular types of connections), and may also report performance information regarding the node. The peers retain the information in local lists.

Thus, each time a node adds or loses a peer, its upstream peers are informed. Each node that receives an update from a downstream peer will forward the update to its own upstream peers until the update eventually reaches a coordinator located within the cluster or external to the cluster. For example, updates may be passed upstream until they reach a node that has no upstream connection within the cluster, at which point that node sends them to the coordinator. Further, if a node that has an update to report has no upstream peers, it may send the update directly to the coordinator. The coordinator therefore stays abreast of nodes' statuses regarding peers, which allows it to accurately identify potential attachment zones to new nodes.

In some embodiments, when a node is terminated because the content item has finished, the user closed the agent, or for some other reason, it may transmit disconnect messages to its peers. In other embodiments it may just terminate and, after its peer connections time-out, the peers will tear-down the connections.

In some embodiments of a synthetic peer-managed content distribution network, means are provided for testing the operation of the network with different configuration parameters. For example, any or all of the parameters described herein may be tested (e.g., peering efficiency during initial cluster development, subnetwork mask for defining a cluster boundary). The testing occurs in a sandbox-type environment that runs in parallel with the existing peer-managed network (e.g., the same user devices, the same agents, the same physical infrastructure), but does not affect operation of the existing network.

Testing may employ WebRTC® (Web Real-Time Communications) and/or other tools and protocols to establish test nodes on user devices without interrupting normal use of the devices or any other nodes on the device that are currently distributing content. The test nodes may then participate in a simulated content item event (e.g., simulated distribution of a content item), and collect and report any or all of the data normally reported by cluster nodes (as described elsewhere herein).

In some implementations, an administrator configures a test with test values for desired parameters, generates a hyperlink or script to spawn a test node to participate in the test, and distributes the link or script to selected users' devices for activation. In some other implementations, an installed or standalone agent application may be able to join and implement a test without user interaction.

During operation of the test, results may be collected and/or displayed in real-time, such as how many test nodes participate in the test (e.g., its 'reach'), the amount of bandwidth of the organization's network and/or external links used during the test, bandwidth savings reflecting how much of the test content transited only the organization's network instead of external communication links, and peering efficiency. Peering efficiency measures how closely the observed bandwidth savings approached maximum possible savings.

Any or all of the configuration parameters may be changed during the test and effects of the changes are immediately apparent in the real-time results that are displayed. The administrator can then activate a single control to replace the network's default operating parameters with the test parameters, without having to re-enter them.

In some implementations, testing as described herein may be conducted in anticipation of distribution of a large or important content item. Based on an expected reach of the item, for example, differently sized localities or subnetworks may be tested to determine how clusters might develop and how many nodes may attach to them.

Content Distribution

After a cluster has formed, even with just one or a low number of member nodes, the content item associated with the cluster can be distributed to the member nodes. For example, the root nodes of the cluster may establish links to a source of the item and begin streaming it if it is a live or real-time event, or download as much of it as possible if it is not live or real-time. From the root nodes, the content item can be further distributed within the cluster.

Specifically, the content item is distributed to and through network nodes through a process of 'content peering.' There is no specified order in which pieces or components of the content item are received at a given node, and a node may receive different pieces of the item from different peers. More precisely, a given node needs a dependable stream of pieces of the item in order to present it to a user, but those pieces may reach the node via different routes. In addition, because the node may retain pieces of the content item for only a limited period of time after they have been presented, at any given time it will only be able to forward to another node the pieces that it has in cache or other available storage. A 'piece' or 'component' of a content item may be an arbitrary sequence of bytes from one offset to another within the item, or may correlate to time segments, blocks, tracks, chapters, or other recognized components of some types of content.

In some embodiments, each content item has an associated content identifier that is unique within the peer-managed content delivery network. A cluster or, more precisely, a root node of a cluster that forms to access a given item can request the item by identifier from a source external to the cluster. Individual pieces or components of the item may have unique object identifiers so that nodes can identify which parts of the item they possess and/or which ones they need.

As described above, a node has different types of connections with different peers (e.g., upstream, midstream, downstream). These connections affect how the node obtains the content item and where it may forward the content. For example, a node that receives content via the peer-managed content delivery network is termed a 'content consumer.' A content consumer receives content only from upstream and midstream peers (i.e., not from downstream peers).

A 'peer content provider' provides content if it has it, but returns failure messages if it does not. A peer content provider provides content only to downstream and midstream peers (i.e., not upstream peers).

A 'cluster content provider' (or 'graph content provider') is a node that, in response to a request for the content item or a piece of the item (e.g., from a content consumer), makes a best effort to find and obtain the content from its connected peers. A cluster content provider receives and responds to content requests only from downstream nodes (i.e., not midstream or upstream nodes). In some embodiments, every node that has a downstream peer is a cluster content provider. Therefore, when a node cannot obtain desired content from its peers it issues a request to an upstream peer, which will forward the request upward, if necessary, until the request reaches a node that has the content or that can retrieve the content and send it downward through the cluster. A node that does not have an upstream peer may request desired content directly from the source or origin.

To facilitate knowledge of peers' states or statuses regarding the content item, a message protocol is implemented by member nodes of each cluster within a content delivery network. The protocol defines messages that a node may transmit to communicate its current state, and are broadcast by the node only to its connected peers. Examples provided here use byte ranges to identify pieces or portions of the content item, but other units may be employed in other implementations, such as segments denoted by time. Byte ranges may be predetermined and associated with separate identifiers to make identification of individual pieces easier. Each message may explicitly identify the content item (e.g., by its content identifier).

Illustrative messages include HAVE, PENDING, PARTIAL, and EVICTED. A HAVE message signifies that the sending peer node possesses the entire item (e.g., in cache). Thus, the sender is able to provide any or all of the content item to its peers. A PENDING message signifies that at least some of the content item is currently being received by the sending node (from one or more peers).

A PARTIAL message identifies one or more ranges of bytes or other pieces of the content item, and signifies that the sending node possesses those pieces (but not others, although it may be in the process of receiving others). The node may repeat the PARTIAL message as it receives more pieces, until the entire content item is stored, at which time the PARTIAL message ceases and a HAVE message is broadcast. An EVICTED message signifies that no portion of the content item is available at the sending peer node.

A typical sequence of transitions of a member node of a cluster is to first broadcast EVICTED while it locates a provider for the item, then PENDING as it receives some of the content item, followed by one or more PARTIAL messages as it stores pieces of the item, and then HAVE after the item is complete (if it ever becomes complete). If and when the item is no longer being presented to a user, it may be ejected from storage, at which time the node again broadcasts EVICTED if it has not yet departed the network. Similarly, if a node's local storage (e.g., cache) is full, it may need to remove one or more pieces of a content item in order to buffer other pieces (e.g., on a least recently used or LRU basis).

Figure 3:
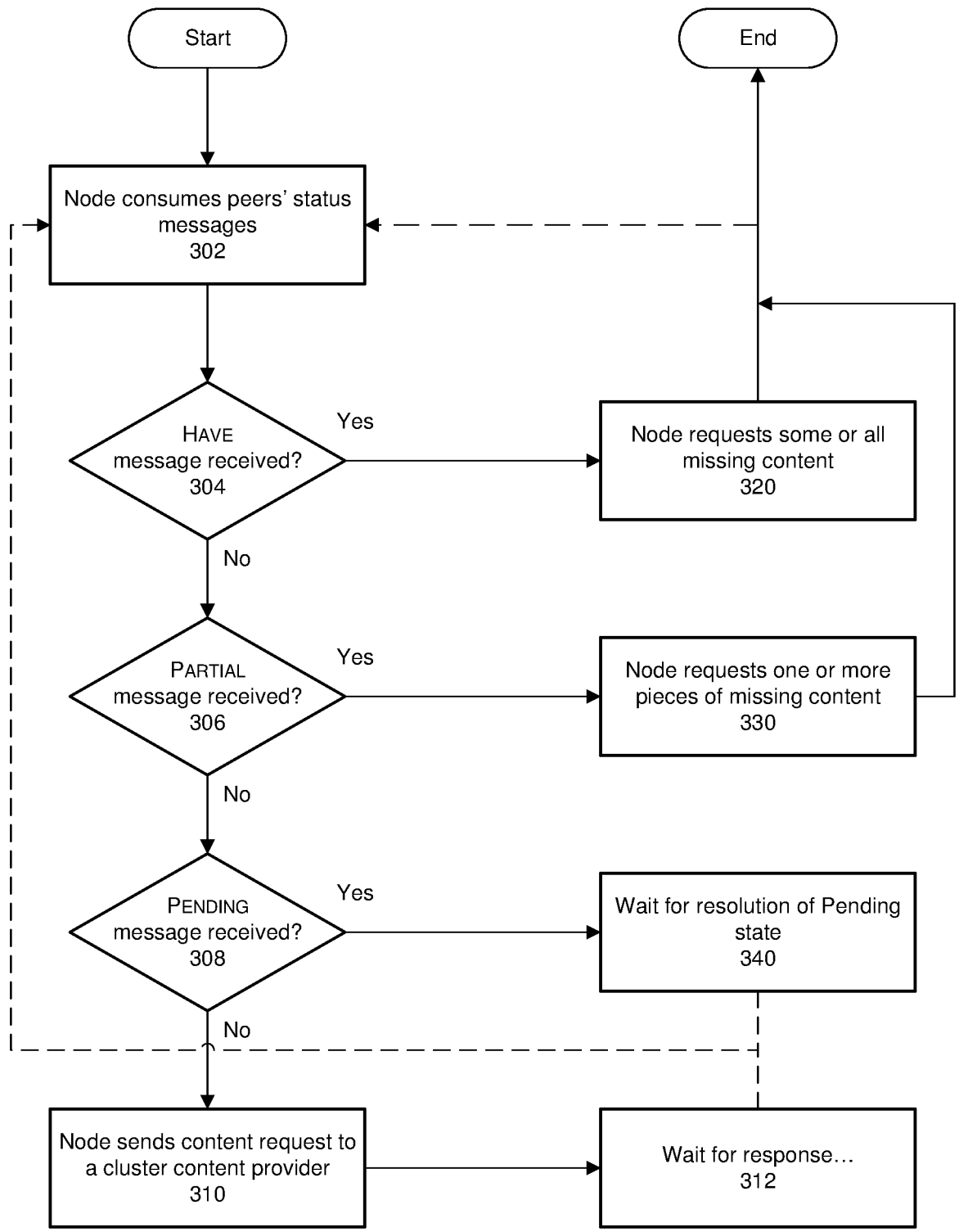
FIG. 3 is a flow chart demonstrating a method of distributing content via a peer-managed content delivery network, in accordance with some embodiments.

FIG. 3 is a flow chart demonstrating a method of content distribution content via a synthetic peer-managed content delivery network, according to some embodiments. In one or more embodiments, one or more of the operations may be omitted, repeated, and/or performed in a different order. Accordingly, the specific arrangement of steps shown in FIG. 3 should not be construed as limiting the scope of the embodiments.

The illustrated method is intended to enable a node in a cluster to present the associated content item to a user, which is possible when some or all of the content item is located (e.g., cached) at the node.

In operation 302, the node continually consumes messages from its connected peers and learns their states regarding the content item (e.g., Have, Partial, Pending, Evicted). The state of the current node may be Evicted if, for example, it just joined the cluster. Alternatively, all other states are possible if it is not a new member of the cluster. For example, it's state may be Have if it previously presented some of the content but then became inactive for a while because its user paused the content or was engaged in other tasks, and the content has not yet been ejected from cache.

The remainder of the method assumes the node's state is other than Have, because once in that state the method of obtaining the content item ends for the node and the agent or other associated software (e.g., a media player) can present (or finish presenting) it to the interested user.

In operation 304, the node determines whether it has received a HAVE message from any peer. If so, the method advances to operation 320.

In operation 306, the node determines if it has received a PARTIAL message that identifies a piece or portion of the content that the node requires. If so, the method advances to operation 330.

In operation 308, the node determines whether it has received a PENDING message from a peer. If so, the method advances to operation 340.

In operation 310, the node cannot obtain the content it needs from a peer content provider. Therefore, it sends a request to a designated cluster content provider (CCP).

In operation 312 the node waits for a response from the cluster content provider. It may also continue to monitor peers' status messages and proceed to one of operations 320, 330, 340 if a HAVE, PARTIAL, or PENDING message is received.

In some embodiments, if the CCP has the requested content (e.g., a specified byte range), it responds immediately. Otherwise, it requests the specified content from its own peers. If the content is not available at its peers, which may be gleaned from FAILURE messages from those peers, it sends a request to its own cluster content provider(s). This process may be repeated throughout the cluster until the request is satisfied or a CCP that receives the request cannot fulfill it and no other CCPs exist (e.g., because it is a root node of the cluster). In this case, the final CCP ingests the content or piece of content directly from the origin or source (external to the cluster) and sends a response that propagates downward through the cluster, retracing the path of the request. Nodes that receive the content (or content piece) may cache it locally in addition to sending it downward. While waiting, the node may return to operation 302 at any time.

In operation 320, the node requests the content it is missing from a peer that sent a HAVE message. The node may request the entire item, since the peer from which it is requesting the content has the entire item, or just the piece or pieces it lacks (e.g., by byte range). If the node receives the content in response to the request, the method ends.

Otherwise, if the peer from which the content is requested fails to respond or responds with a failure (meaning that it cannot provide the content), the method may return to operation 302 or some other operation. For example, if HAVE messages had been received from multiple peers, it may contact one of the others that are in the Have state. Or, the method may jump to operation 330 if one or more PARTIAL messages had been received indicating the availability of content that the node lacks.

In operation 330, the node requests some or all pieces of the content item it is missing (e.g., by byte range) from a peer that sent a PARTIAL message. If the node receives the content in response to the request, the method ends. Otherwise, if the node from which the content is requested fails to respond or responds with a failure (meaning that it cannot provide the content), the method may return to operation 302 or some other operation. For example, if PARTIAL messages had been received from multiple peers advertising the availability of content the node needs, it may contact one of the others that are in the Partial state.

In operation 340, the node waits for the peer or peers that advertised Pending states to resolve (e.g., to change to Partial or Have), or for receipt of a HAVE or PARTIAL message, and then returns to operation 302. If no peers emerge from the Pending state, and no new HAVE or PARTIAL messages are received within a threshold period of time, the method may skip to operation 310.

During or after the method shown in FIG. 3, when the node receives a positive response to a content request, the node begins sending PENDING state messages because it should soon begin receiving content, or PARTIAL messages if it already possesses other parts of the content. It then emits PARTIAL messages as it obtains pieces of the content item, and eventually sends HAVE state messages when the item is complete. At any point, it may receive content requests from its midstream and downstream peers.

Now that it can act (or is acting) as a peer content provider, possibly in addition to a consumer (if it does not yet have the entire content item), it is responsible for immediately responding to the requests as best it can. In particular, it will send the requested piece(s) of the content item (or the entire item, depending on the request and what it possesses). If, however, the full extent of the requested content is not available, or the requested range is invalid, or if the requested content identifier is not recognized, the node may return a FAILURE message or send any portion of requested content that it does possess.

In some embodiments, a node in a cluster may simultaneously receive different pieces of a content item from different peers. For example, the node may respond to PARTIAL messages from multiple peers by requesting and receiving pieces of the content item from each one.

To measure peers' performance, a node monitors various metrics during content sharing (i.e., when the node receives content from a peer). For example, during some or all transfers, the node may track latency, throughput, bandwidth, the amount of content it receives, and so on. Based on these measurements, a node may rank its peers in terms of their performance and, when multiple peers advertise availability of content needed by the node, the node may prioritize the higher performing peers when sending content requests. If a node determines that a peer's performance has been below a threshold (or has been uncommunicative) for a predetermined period of time, it may disconnect from that peer (e.g., with a DISCONNECT message) and may seek a replacement peer.

As described above, when a node encounters difficulty in connecting with enough peers to fill its capacity, it may seek peer candidate lists from other nodes. In addition, it may issue a new attachment request to the coordinator to obtain a list of peer candidates. However, the coordinator (which is aware of excess capacity among all network nodes) may respond by identifying other attachment zones with more potential peers than are available from the node's current logical position. In this case the node may detach itself and attempt to attach in a new zone.

Data Aggregation

In addition to the distribution of content from one or more sources to the member nodes of a peer-managed cluster or network, the cluster or network may also be used to aggregate and report data from the nodes to one or more central entities (e.g., a supervisor entity, a statistics service). For example, on a regular basis (e.g., one minute, five minutes, fifteen minutes), each node may generate and send a report to one upstream peer. If a node doesn't have an upstream peer, it may instead send the report to a midstream peer or may send the report directly to the entity that ultimately receives the nodes' reports. When a node sends its report upwards, it includes any reports it has received from downstream peers.

In some embodiments, multiple types, categories, or classes of metrics, statistics, measurements, observations, and/or other data are collected and reported upward through a cluster, by each node, so that a central entity can evaluate the performance of all nodes. One type of data includes media presentation events (or "play events") produced by a media player that presents a content item to a user associated with a node. In particular, the media player emits (and the node collects) media events that occur in association with the content presentation, including operations such as load content, seek, play, pause, stop, etc., and corresponding timestamps and/or durations.

A second type of data includes content transfer events (or just "transfer events") generated within network peers during the distribution or sharing of content. For example, each peer may observe and report how much content it receives and from where it was received (which may be a peer or a source external to the network), latency, throughput, bandwidth consumed, and so on. The content amount associated with a transfer event may be measured in bytes, time segments, blocks, or other pieces. The time required for the content transfer may also be reported so that throughput can be calculated for different sources, different content, different positions within the network, etc.

A third type of data includes session metadata regarding the user and/or the environment in which each node is created, configured, and/or operates. For example, when a software node is instantiated, it gathers data or metadata that identify its user or software host/platform, such as a browser (and which type), an installed application, or a video-conferencing application or service. The node may also report network address(es) for identifying a platform associated with the node, and may store a persistent browser cookie, if possible, to provide a persistent identifier of the user's software platform. A node may also report its up-time, down-time, numbers and/or types of connected peers, unused node capacity, attachment requests sent and/or received, attachments to other nodes, etc.

In an illustrative embodiment, when a user opens a session by activating the agent software to access a particular content item, and a node is instantiated, that node will attempt to use the most precise user-identifying information it has access to, which may vary from network to network depending on rules specified by the organization in which the cluster resides. For example, the node may first attempt to read a user identifier that is unique across an organization (e.g., a login id, an Office 365° user id or digest) or an application identifier (e.g., an application user id, an identifier of the user's agent software).

One benefit of using relatively precise information to identify a user, especially information that persists across user sessions and devices, is that a more accurate tally can be made of the number of unique users that consume a given content item, even if they use different devices to access the item and/or access different items. When a less precise identifier is adopted (e.g., a node id, a browser user id from a browser cookie, a play id associated with a media player session), it may not be possible to detect when the same user accesses one content item via different nodes, browsers, or media players, and each encounter may be recorded as involving a different user.

In different embodiments, data collected and reported by network nodes may be funneled upward to an entity within a given cluster or network, or to an entity external to the network. For example, different clusters may correspond to different organizations' networks or different subnets within a given network, and the data may be consumed within the organization and/or by a supervisor or other external entity that helps configure or manage a cluster or network.

In some implementations, the supervisor is a service (e.g., a statistics service) that is similar to but that operates independently of the coordinator illustrated in FIG. 1. Thus, the supervisor receives the types of reported data described above (e.g., as JSON or JavaScript® Object Notation records), and/or others (e.g., diagnostic data), and processes the data through one or more ETL (Extract, Transform, Load) pipelines to compute various measures regarding the effectiveness and operation of the peer-managed network(s) it supervises.

An environment in which one or more embodiments described above are executed may incorporate a general-purpose computer or a special-purpose device such as a hand-held computer or communication device. Some details of such devices (e.g., processor, memory, data storage, display) may be omitted for the sake of clarity. A component such as a processor or memory to which one or more tasks or functions are attributed may be a general component temporarily configured to perform the specified task or function, or may be a specific component manufactured to perform the task or function. The term "processor" as used herein refers to one or more electronic circuits, devices, chips, processing cores and/or other components configured to process data and/or computer program code.

Data structures and program code described in this detailed description are typically stored on a non-transitory computer-readable storage medium, which may be any device or medium that can store code and/or data for use by a computer system. Non-transitory computer-readable storage media include, but are not limited to, volatile memory; non-volatile memory; electrical, magnetic, and optical storage devices such as disk drives, magnetic tape, CDs (compact discs) and DVDs (digital versatile discs or digital video discs), solid-state drives, and/or other non-transitory computer-readable media now known or later developed.

Methods and processes described in the detailed description can be embodied as code and/or data, which may be stored in a non-transitory computer-readable storage medium as described above. When a processor or computer system reads and executes the code and manipulates the data stored on the medium, the processor or computer system performs the methods and processes embodied as code and data structures and stored within the medium.

Furthermore, the methods and processes may be programmed into hardware modules such as, but not limited to, application-specific integrated circuit (ASIC) chips, field-programmable gate arrays (FPGAs), and other programmable-logic devices now known or hereafter developed. When such a hardware module is activated, it performs the methods and processes included within the module.

The foregoing embodiments have been presented for purposes of illustration and description only. They are not intended to be exhaustive or to limit this disclosure to the forms disclosed. Accordingly, many modifications and variations will be apparent to practitioners skilled in the art. The scope is defined by the appended claims, not the preceding disclosure.

What is claimed is:

1. A method of operating a peer-managed content delivery network, the method comprising:
    configuring a new node in response to a user request for a content item;
    identifying one or more potential attachment zones for the new node within the network, wherein each attachment zone comprises multiple network nodes;
    sorting the attachment zones based on the multiple network nodes within each attachment zone;
    attaching the new node to the network by establishing connections between the new node and one or more of the multiple nodes of a first attachment zone; and
    each time the new node establishes a connection with a new peer, broadcasting information regarding the new peer to all peers of the new node;
    wherein each network node with which the new node establishes a connection is considered a peer of the new node and the new node is considered a peer of each network node with which the new node establishes a connection.

2. The method of claim 1, further comprising:
    when the new node has excess peer capacity, facilitating additional connections between the new node and other network nodes;
    wherein the peer capacity of the new node is specified during said configuring.

3. The method of claim 2, wherein facilitating additional connections comprises:
    receiving at the new node, from other network nodes, one or more lists of peer candidates, wherein a list of peer candidates from a given node identifies peers of the given node that have excess peer capacity; and
    sending connection requests from the new node to at least one peer candidate identified in the one or more lists.

4. The method of claim 2, wherein facilitating additional connections comprises:
    transmitting a request for peer candidates, from the new node to an upstream node one hop closer than the new node to a root node of the network;
    wherein, in response to the request, the upstream node identifies to the new node one or more peers of the upstream node that have excess peer capacity.

5. The method of claim 1, wherein:
    at least one connection of the new node is with an upstream peer one node closer than the new node to a root node of the network;
    at least one connection of the new node is with a midstream peer the same number of hops from the root node as the new node; and
    at least one connection of the new node is with a downstream peer one hop further than the new node from the root node.

6. The method of claim 5, wherein:
    the new node receives components of the content item from upstream peers and midstream peers, and not from downstream peers; and
    the new node transmits components of the content item to midstream peers and downstream peers, and not to upstream peers.

7. The method of claim 1, further comprising:
    periodically transmitting to connected peers, from the new node, status messages regarding possession of the content item at the new node.

8. The method of claim 7, wherein each status message indicates one of the following:
    the new node possesses the entire content item;
    the new node possesses one or more specified components of the content item;
    the new node is pending receipt of one or more components of the content item; and
    the new node possesses no component of the content item.

9. The method of claim 1, wherein identifying the one or more potential attachment zones comprises:
sending an attachment request message to a coordinator entity that stores information regarding the network; and
in response to the attachment request, receiving from the coordinator entity identities of multiple nodes with excess capacity for new connections.

10. The method of claim 9, wherein each identified attachment zone comprises one or more of the multiple nodes.

11. A non-transitory computer-readable medium storing instructions that, when executed by a processor, cause the processor to perform a method of operating a peer-managed content delivery network, the method comprising:
configuring a new node in response to a user request for a content item;
identifying one or more potential attachment zones for the new node within the network, wherein each attachment zone comprises multiple network nodes;
sorting the attachment zones based on the multiple network nodes within each attachment zone;
attaching the new node to the network by establishing connections between the new node and one or more of the multiple nodes of a first attachment zone; and
each time the new node establishes a connection with a new peer, broadcasting information regarding the new peer to all peers of the new node;
wherein each network node with which the new node establishes a connection is considered a peer of the new node and the new node is considered a peer of each network node with which the new node establishes a connection.

12. The non-transitory computer-readable medium of claim 11, the method further comprising:
when the new node has excess peer capacity, facilitating additional connections between the new node and other network nodes;
wherein the peer capacity of the new node is specified during said configuring.

13. The non-transitory computer-readable medium of claim 12, wherein facilitating additional connections comprises:
receiving at the new node, from other network nodes, one or more lists of peer candidates, wherein a list of peer candidates from a given node identifies peers of the given node that have excess peer capacity; and
sending connection requests from the new node to at least one peer candidate identified in the one or more lists.

14. The non-transitory computer-readable medium of claim 12, wherein facilitating additional connections comprises:
transmitting a request for peer candidates, from the new node to an upstream node one hop closer than the new node to a root node of the network;
wherein, in response to the request, the upstream node identifies to the new node one or more peers of the upstream node that have excess peer capacity.

15. The non-transitory computer-readable medium of claim 11, wherein:
at least one connection of the new node is with an upstream peer one node closer than the new node to a root node of the network;
at least one connection of the new node is with a midstream peer the same number of hops from the root node as the new node; and
at least one connection of the new node is with a downstream peer one hop further than the new node from the root node.

16. The non-transitory computer-readable medium of claim 15, wherein:
the new node receives components of the content item from upstream peers and midstream peers, and not from downstream peers; and
the new node transmits components of the content item to midstream peers and downstream peers, and not to upstream peers.

17. The non-transitory computer-readable medium of claim 11, the method further comprising:
periodically transmitting to connected peers, from the new node, status messages regarding possession of the content item at the new node.

18. The non-transitory computer-readable medium of claim 17, wherein each status message indicates one of the following:
the new node possesses the entire content item;
the new node possesses one or more specified components of the content item;
the new node is pending receipt of one or more components of the content item; and
the new node possesses no component of the content item.

19. An apparatus comprising:
one or more processors; and
memory storing instructions that, when executed by the one or more processors, cause the apparatus to perform method of participating in a peer-managed content delivery network, the method comprising:
configuring a new node in response to selection of a content item by a user of the apparatus;
identifying one or more potential attachment zones for the new node within the network, wherein each attachment zone comprises multiple network nodes;
sorting the attachment zones based on the multiple network nodes within each attachment zone;
attaching the new node to the network by establishing connections between the new node and one or more of the multiple nodes of a first attachment zone; and
each time the new node establishes a connection with a new peer, broadcasting information regarding the new peer to all peers of the new node;
wherein each network node with which the new node establishes a connection is considered a peer of the new node and the new node is considered a peer of each network node with which the new node establishes a connection.

20. The apparatus of claim 19, wherein the method further comprises:
when the new node has excess peer capacity, facilitating additional connections between the new node and other network nodes;
wherein the peer capacity of the new node is specified during said configuring.

21. The apparatus of claim 20, wherein facilitating additional connections comprises:
receiving at the new node, from other network nodes, one or more lists of peer candidates, wherein a list of peer candidates from a given node identifies peers of the given node that have excess peer capacity; and
sending connection requests from the new node to at least one peer candidate identified in the one or more lists.

22. The apparatus of claim 20, wherein facilitating additional connections comprises:

transmitting a request for peer candidates, from the new node to an upstream node one hop closer than the new node to a root node of the network;

wherein, in response to the request, the upstream node identifies to the new node one or more peers of the upstream node that have excess peer capacity.

23. The apparatus of claim 19, wherein:

at least one connection of the new node is with an upstream peer one node closer than the new node to a root node of the network;

at least one connection of the new node is with a midstream peer the same number of hops from the root node as the new node; and at least one connection of the new node is with a downstream peer one hop further than the new node from the root node.

24. The apparatus of claim 23, wherein:

the new node receives components of the content item from upstream peers and midstream peers, and not from downstream peers; and the new node transmits components of the content item to midstream peers and downstream peers, and not to upstream peers.

25. The apparatus of claim 19, wherein the method further comprises:

periodically transmitting to connected peers, from the new node, status messages regarding possession of the content item at the new node.

26. The apparatus of claim 25, wherein each status message indicates one of the following:

the new node possesses the entire content item;

the new node possesses one or more specified components of the content item;

the new node is pending receipt of one or more components of the content item; and the new node possesses no component of the content item.

27. A peer-managed content delivery network system, comprising:

one or more root nodes; and a hierarchy of multiple nodes descending from the one or more root nodes and interconnected by communication links, wherein each node in the hierarchy operates on an associated user device to obtain the content item for a corresponding user and comprises persistent communication connections with:

at least one upstream node located one hop closer to the one or more root nodes than the node;

at least one midstream node located the same number of hops from the one or more root nodes as the node; and at least one downstream node located one hop further from the one or more root nodes than the node;

wherein after a content item is received at the one or more root nodes, each of a plurality of nodes, including the one or more root nodes, shares the content item with midstream nodes and downstream nodes, but not with upstream nodes.

28. The peer-managed content delivery network system of claim 27, further comprising:

a coordinator to identify available network attachment zones to potential new network nodes, wherein the coordinator receives and stores statuses of all nodes in the network.

29. The peer-managed content delivery network system of claim 27, wherein the one or more root nodes and the multiple nodes execute on logically clustered host devices, each device comprising:

one or more processors;

memory; and storage for storing the content item.

30. A method of operating a peer-managed content delivery network, the method comprising:

configuring multiple nodes for accessing a single content item on behalf of corresponding users;

hierarchically connecting each node in the multiple nodes to a plurality of peer nodes;

sharing the content item among connected peers by:

transmitting components of the content item only to downstream and midstream peers; and receiving components of the content item only from upstream and midstream peers; and at each node of the network, periodically informing the node's peers of the node's status, wherein the status comprises:

an amount of the content item stored at the node; and capacities of each peer of the node to accept new connections, if any.

31. The method of claim 30, further comprising:

receiving from a new node a request to attach to the network;

identifying to the new node one or more attachment zones, each zone comprising multiple nodes with capacity to add at least one peer;

wherein the new node issues connection requests to the multiple nodes in at least one of the identified attachment zones.

32. The method of claim 30, further comprising, when a first node has excess peer capacity, facilitating additional connections between the first node and other network nodes by:

receiving at the first node, from one or more other network nodes, one or more lists of peer candidates, wherein a list of peer candidates from a given node identifies peers of the given node that have excess peer capacity; and sending connection requests from the first node to at least one peer candidate identified in the one or more lists.

33. The method of claim 30, further comprising, when a first node has excess peer capacity, facilitating additional connections between the first node and other network nodes by:

transmitting a request for peer candidates, from the first node to an upstream node one hop closer than the first node to a root node of the network;

wherein, in response to the request, the upstream node identifies to the first node one or more peers of the upstream node that have excess peer capacity.

* * * * *